(No Model.) 10 Sheets—Sheet 2.
E. C. SMITH.
PROCESS OF AND MACHINE FOR MAKING PLASTER BOARDS.
No. 597,332. Patented Jan. 11, 1898.

FIG. 2

WITNESSES:

INVENTOR
Eugene C. Smith (No Model.)   10 Sheets—Sheet 4.

E. C. SMITH.
PROCESS OF AND MACHINE FOR MAKING PLASTER BOARDS.

No. 597,332.   Patented Jan. 11, 1898.

WITNESSES:   INVENTOR
Eugene C. Smith (No Model.) 10 Sheets—Sheet 7.
E. C. SMITH.
PROCESS OF AND MACHINE FOR MAKING PLASTER BOARDS.
No. 597,332. Patented Jan. 11, 1898.

WITNESSES: R. Heimbürger, Henry N. Brown

INVENTOR Eugene C. Smith (No Model.) 10 Sheets—Sheet 9.
E. C. SMITH.
PROCESS OF AND MACHINE FOR MAKING PLASTER BOARDS.
No. 597,332. Patented Jan. 11, 1898.

Fig. 14.

(No Model.) 10 Sheets—Sheet 10.

E. C. SMITH.
PROCESS OF AND MACHINE FOR MAKING PLASTER BOARDS.

No. 597,332. Patented Jan. 11, 1898.

UNITED STATES PATENT OFFICE.

EUGENE C. SMITH, OF NEW YORK, N. Y., ASSIGNOR TO THE PLASTER MACHINE COMPANY, OF NEW YORK.

PROCESS OF AND MACHINE FOR MAKING PLASTER-BOARD.

SPECIFICATION forming part of Letters Patent No. 597,332, dated January 11, 1898.

Application filed June 8, 1896. Serial No. 594,708. (No model.)

*To all whom it may concern:*

Be it known that I, EUGENE C. SMITH, a citizen of the United States, and a resident of the city, county, and State of New York, have invented certain new and useful Improvements in Processes and Machines for Manufacturing Plaster-Board, of which the following is a specification.

My invention relates to machines and processes for manufacturing plaster-board.

The process and also the essential elements of the machine can be employed both in connection with a traveling mold, as illustrated in Figures 1 to 12, inclusive, of the drawings which accompany this specification, and in connection with a stationary mold, as illustrated in Figs. 13 to 16 of the said drawings. Heretofore the difficulty which has prevented such board from obtaining general use has been that the processes of manufacture have introduced into the finished board so great a percentage of water that the drying of the materials has been tedious and expensive. With existing methods, moreover, it has not been generally possible to reduce the percentage of water very much, because the excess of water has been needed to delay the setting of the plaster during the necessary manipulations of the composition. I have, however, invented a process, as well as apparatus, for efficiently carrying it into effect wherein after mixing the plaster-of-paris or other suitable substance with the excess of water I add to it such a proportion of dry plaster-of-paris, lime, cement, or like substance (or the same combined with suitable fibrous material, as wood chips) that the additional plaster-of-paris, lime, &c., will greatly reduce the percentage of water over and above that necessary to induce the chemical reactions as compared with the total weight of the plaster-of-paris, lime, cement, or other like substance.

The invention also relates to the apparatus for producing the continuous alternations of mixing the composition and of cleaning out the channels of the apparatus by water or steam flushes, by which adhering particles of plaster are blown out and the clogging of the apparatus prevented.

Finally, the invention relates to the novel parts and combinations of parts of which the apparatus is composed.

Referring to the drawings which accompany the specification to aid the description, Fig. 1, Sheet 1, is an elevation of a machine for making slabs as seen from the right of Fig. 2; Fig. 7, Sheet 6, is an elevation and section of the mixing-bowl, distributing-pipes, and valves as seen from the right of Fig. 2.

Figure 1:
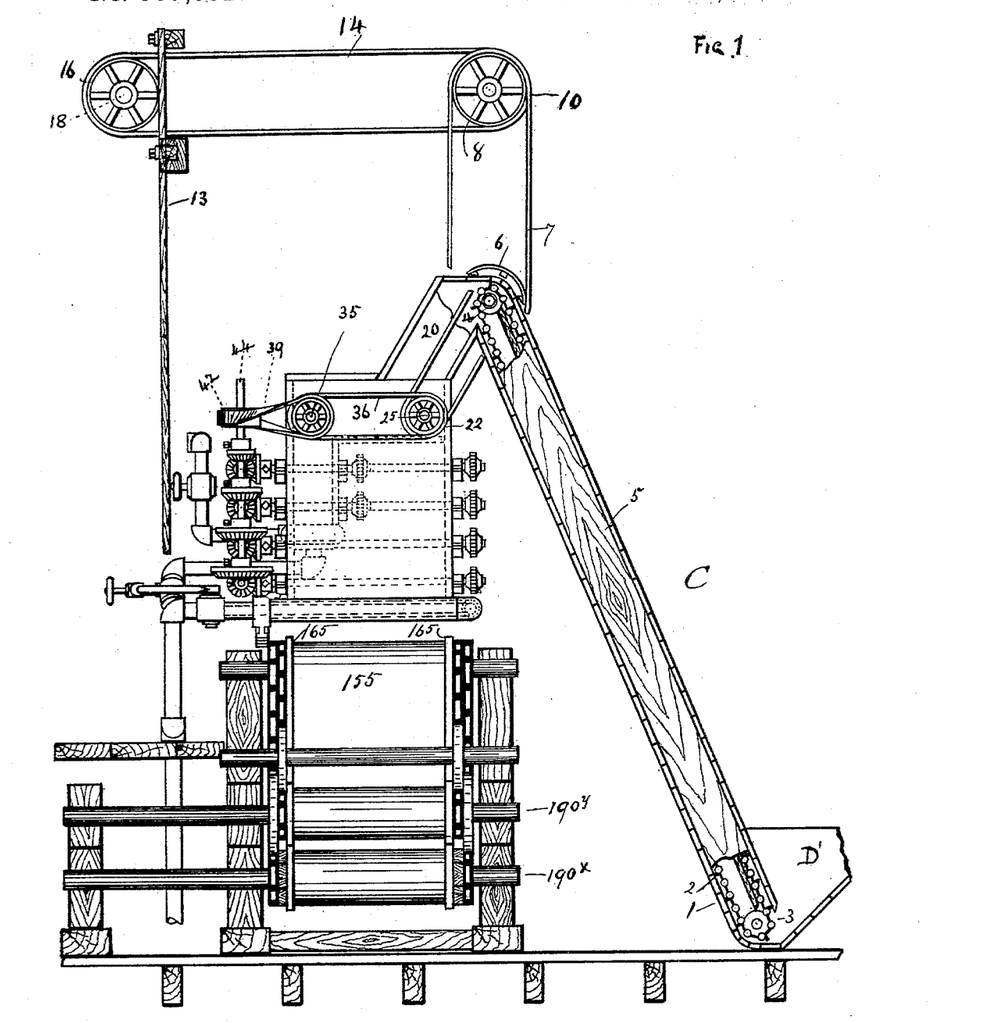
Figure 2:
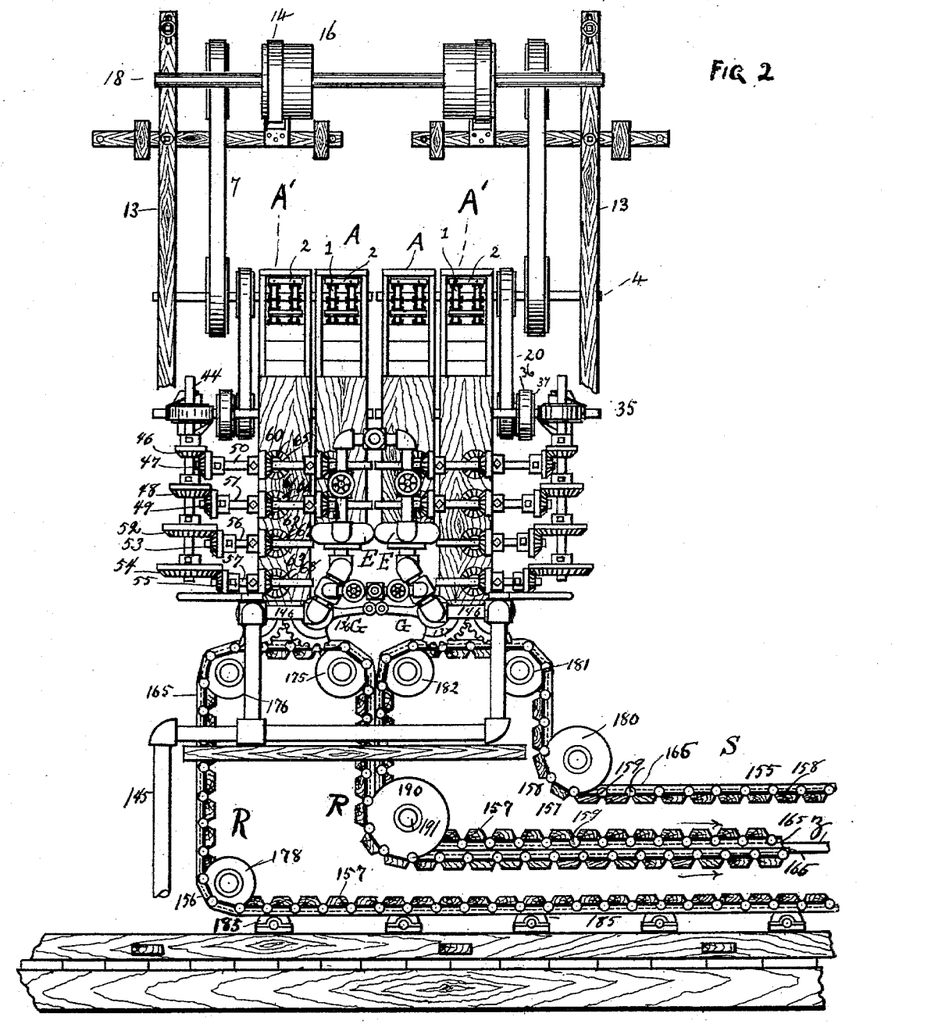
Fig. 2, Sheet 2, is an elevation of the receiving end of the machine as seen from the left of Fig. 1.

*The general operation.*—Referring to Figs. 1 to 12, the machine is preferably made double, so that one part can be operated while the other is being cleaned out, each part having a hopper A for the original charge of dry plaster-of-paris or other suitable material and a hopper A' for the additional dry stuff. There are two elevators C C for the plaster-of-paris, one for each hopper A, and two elevators C' C' for the dry stuff, one for each hopper A' A'. The elevators raise their respective materials from boxes or hoppers D D D' D', Figs. 1 and 3. From whichever hopper A that is in action the dry plaster-of-paris falls into the mixing chamber or bowl E, where it is mixed with a proper excess of water and propelled through pipe $e$ to the steam ejector or propeller F, and thence (being now wet stuff) into the distribution-pipes G, Figs. 6 and 7, whence it is discharged and falls upon that apron which is vertically below said distribution-pipes. As it falls the wet stuff is thoroughly mixed with the shower of dry stuff which falls from the corresponding hopper A'. The point on the said carrier where the wet stuff (being mixed while falling with its quota of dry stuff, as just stated,) falls upon the apron is near to the entrance to the traveling mold, which is formed of the said aprons R S, as shown in Fig. 2, so that the movement of the apron soon brings the mixed stuff into said mold, where it is pressed and shaped, much of the surplus water being expelled, the mass, which is now in the form of a long continuous slab $z$, Fig. 2, being delivered at the extreme left end of the machine, cut into boards by any suitable machine, and dried.

Figure 3:
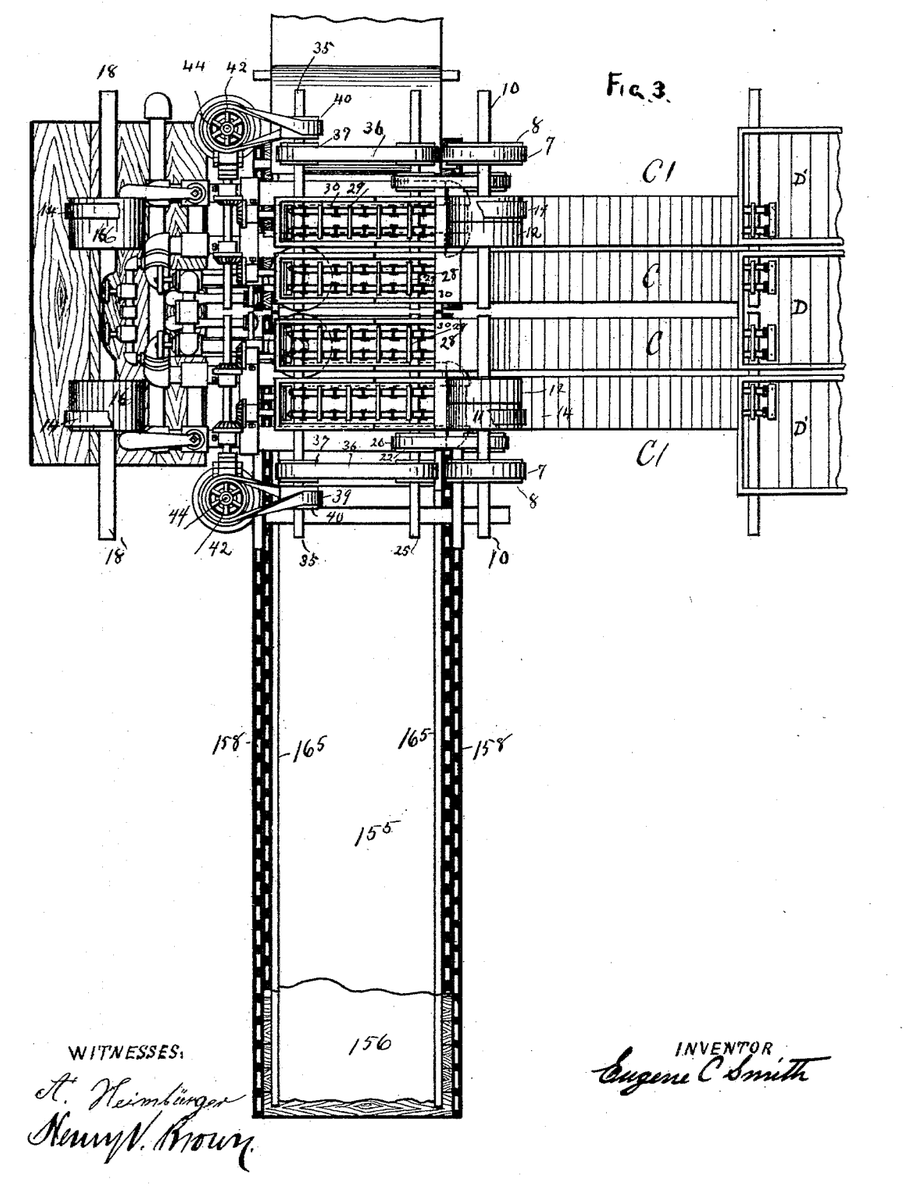
Fig. 3, Sheet 3, is a broken plan of the machine, the extreme delivery end not being shown.

*The elevators and hoppers.*—All the elevators are alike and consist of any suitable link-belts 1, carrying crosswise boards or buckets 2 and traveling around sprockets 3 4 in an inclined elevator-leg 5. Power is derived from pulleys 6, driven by belts 7 from pulleys 8 on shaft 10, Fig. 3, and these in turn driven by pulleys 11 on said shaft 10 and belts 14 from pulleys 16 on the main power-shaft 18. Pulleys 16 are broad-faced. Pulleys 12 are loose on shaft 10. When the shippers 13 throw the belts 14 onto pulleys 12, the corresponding elevator, carriers, and beaters stop. As shown in Fig. 3, there are two shafts 10, with their complement of pulleys 11 12 and belts 14. A belt 20 from a pulley on the shaft of sprocket 4, Fig. 1, drives pulley 22, fixed on shaft 25. Shaft 25 passes the two hoppers of one-half of the apparatus and carries sprockets which drive the endless conveyers or distributers 28, Fig. 3. These conveyers consist of slats 29, extending transversely of and fixed on link-belts 30 30, Fig. 3. Opposite to shafts 25 the carriers go around sprockets on shafts 35, belts 36 from pulleys on shafts 25 going around pulleys 37 on said shafts 35, as shown on Figs. 1 and 3. Crossed belts 39 from pulleys 40 on said shafts 35 drive horizontal pulleys 42 on vertical shafts 44, which carry bevel-gears 46 48 52 54, driving, respectively, bevel-gears 47 49 53 55 on shafts 50 51 56 57, and the diameter of said gears is such that the lower shafts revolve at greater velocities than the upper, the lowest shaft most rapidly. Said shafts 50 51 56 57 each carry bevel-gears 60 61 62 63, meshing with bevel-gears 65 66 67 68 on shafts 70 71 72 73, which pass across hoppers A' A' and have the beaters 75 76 77 78, respectively, Fig. 4. Each of said shafts 70 71 72 73 carries pinions 80 81 82 83, meshing with smaller pinions 85 86 87 88 on shafts which respectively carry beaters 95 96 98, Fig. 5. In said Fig. 5 only three rows of beaters are shown, the part of the hopper which contains the upper row being broken off.

Figures 4, 5:
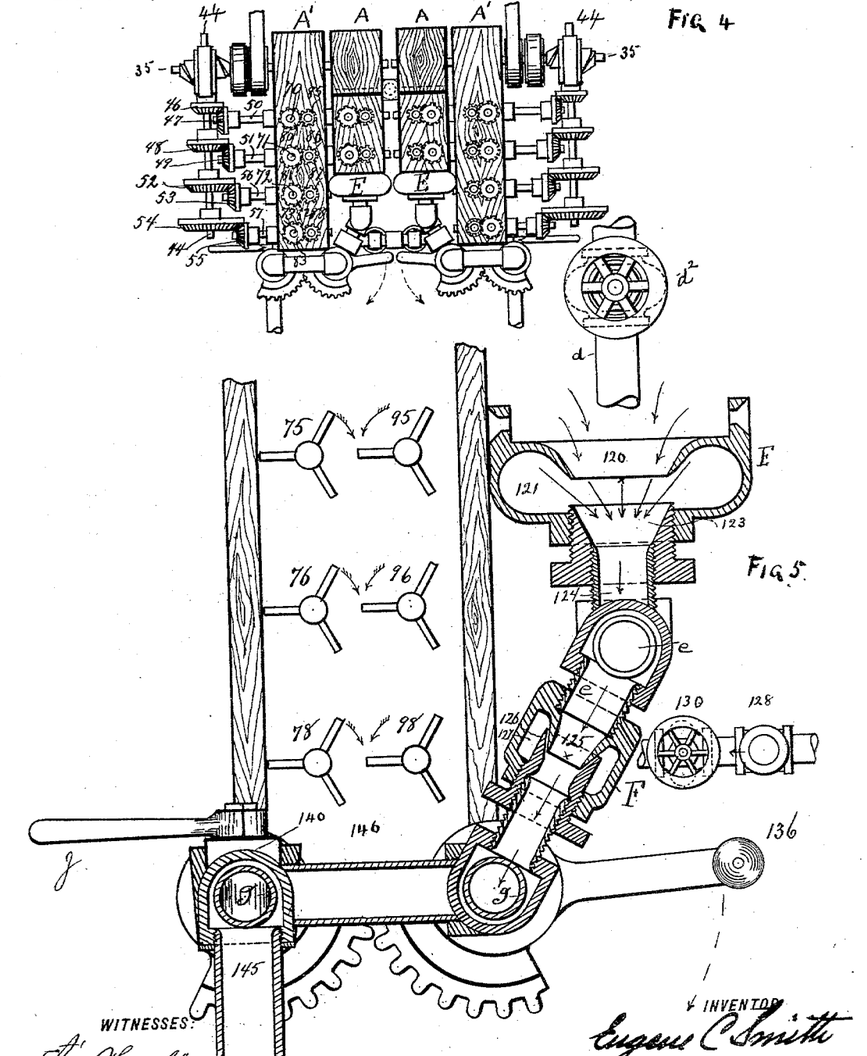
Fig. 4, Sheet 4, is a part elevation of the machine as seen from the right of Fig. 1, the elevator being removed.
Fig. 5, Sheet 4, is a broken vertical section, on a large scale and on a plane at right angles to that of Fig. 2, of the water and steam propellers and the leg of the dry-plaster hopper with its beaters or distributers.
Figure 6:
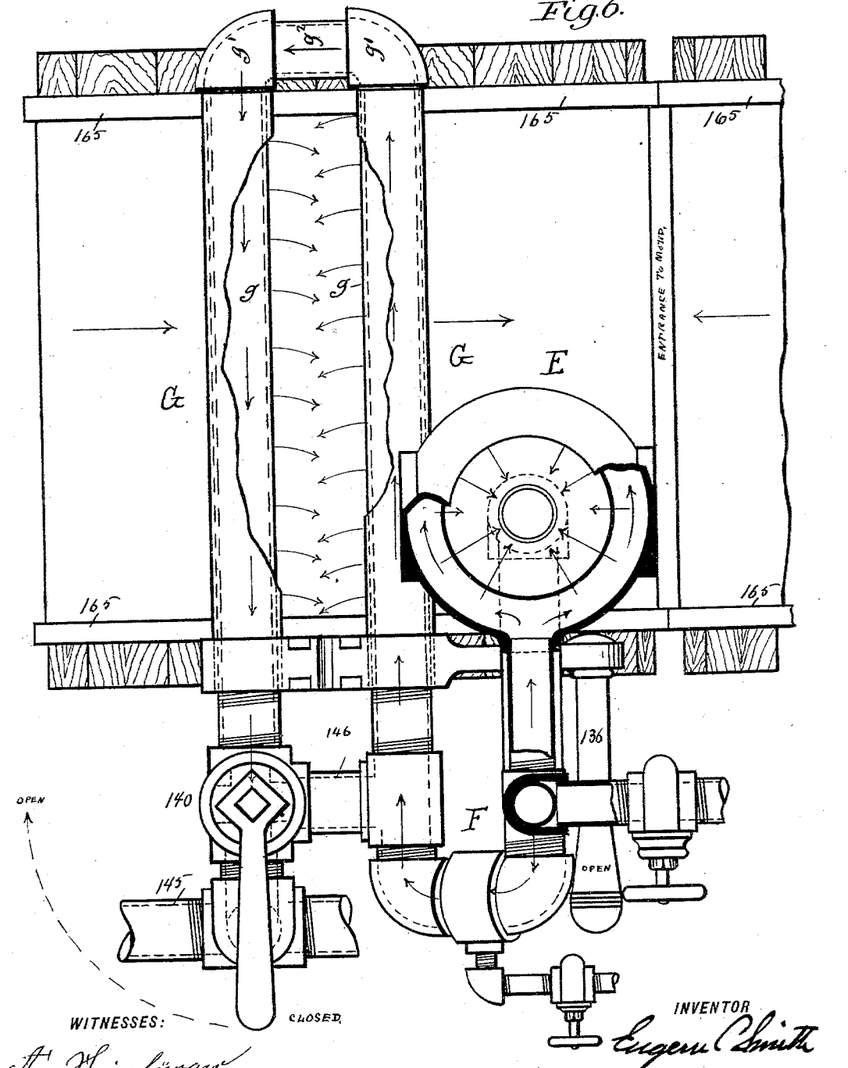
Fig. 6, Sheet 5, is a plan and section, on a large scale, of the mixing-bowl, distributing-pipes, and valves.
Figure 8:
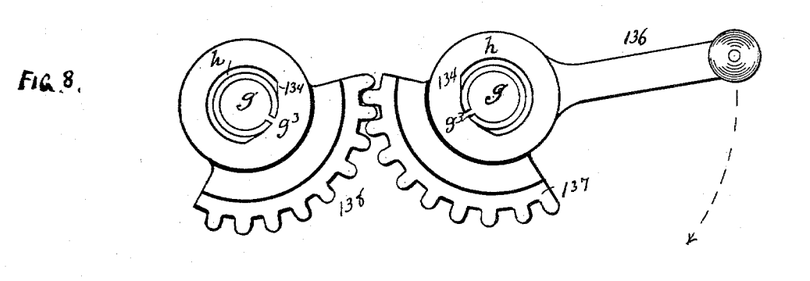
Figs. 8 and 9, Sheet 7, are details of the divice for regulating the distribution of the wet stuff and respectively open and closed.
Figure 9:
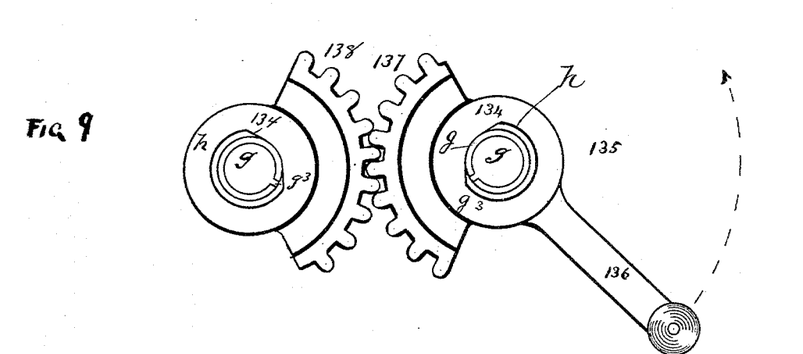
Figure 10:
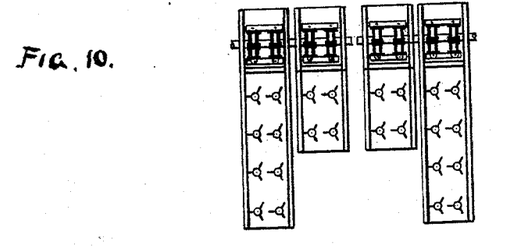
Fig. 10, Sheet 7, is a vertical section through the hoppers on a plane parallel to the aprons or traveling mold and showing the beaters or distributers.

In the shorter hoppers A A there may of course be only two sets of beaters, the shafts for which are indicated on Figs. 2 and 4. By the action of the beaters the materials are not only thoroughly broken up, but are made to fall in fine practically uniform showers, whereby I can nicely graduate the amounts delivered at the different parts of the apparatus.

*The mixing and distributing apparatus.*—The materials from one or the other hopper A fall within the curved lip 120 of the corresponding bowl E and are then propelled by water from pipe $d$ (which issues from the circular slit 121 of the lip 120, Figs. 5 and 7) through the chamber 123 into the pipe 124 and to the steam ejector or propeller F. Said propeller F is constructed in the usual manner with the nozzle 125, annular lip 126, and chamber 127, which is connected with a steam-pipe 128. The valves $d^2$ and 130 respectively control the amount of water and steam which is mixed with the plaster-of-paris or other materials, and the bowl E is in effect not only a mixer but a propeller of the mixed stuff. By the propeller or ejector F the wet stuff is propelled into and through the distribution-pipes G. $g$ is an inner stationary pipe, which is arranged with parallel lengths connected by elbows $g'$ and nipple $g^2$, Fig. 6, and has a long through-and-through slit $g^3$, Figs. 8 and 9, in the inner side of the parallel lengths. A rotatable sheath-pipe $h$ surrounds each of the parallel pipes $g$ and has a long slit 134, corresponding to the slit $g^3$. One of said pipes $h$ is provided with a collar 135 and handle 136, and the collar 135 is provided with a segmental gear 137, meshing with a corresponding segmental gear 138 on a similar collar of the other pipe or sheath. Thus the sheath-pipes $h$ may be set so as to register the slots 134 with the slits $g^3$, in which case the wet stuff can pass out of the slits $g^3$, Fig. 8, or so as to close the slits and confine the wet stuff, Fig. 9. A three-way valve 140 is placed at the outlet end of the distribution-pipes G. The ports on the plug are so arranged that they can put the outlet end of the distribution-pipes G into communication with the discharge-pipe 145, also, however, leaving a cross connection open through pipe 146 with the other branch of the distribution-pipes, or can cut off the discharge-pipe 145 and leave the communication between the two branches of the distribution-pipes open, (position of Fig. 6.) In this latter position the sheath-pipes will also be placed to open the slits $g^3$, so that the wet stuff will be discharging from the slits as it circulates around. The place of discharge is adjacent to where the aprons R S meet to form the traveling mold, Fig. 2, so that the wet stuff falls directly on one or the other aprons R or S and is carried to the mold. In the former position the sheath-pipes will be closed, so that stuff blows out through the discharge-pipes, except that a part may circulate around in the distribution-pipes, helping to scour them out.

The dry stuff (the dry plaster-of-paris and filling material, such as wood chips) falls from whichever hopper A' is working, and which corresponds with the set of distribution-pipes which are working, in an even shower down into the space between the parallel lengths of its set of distribution-pipes, Figs. 4 and 5. While the dry stuff is so falling the wet stuff is being constantly carried past the bottom of the hopper A', so that all parts of its surface come into contact with the dry stuff, which is immediately thereafter thoroughly mixed into the wet stuff by the mold. Thus the construction described provides that relative motion between the wet stuff and dry stuff hereinbefore referred to.

The distribution-pipes are cleaned out after having operated for a suitable time by first stopping the carriers by means of the proper shippers 13, whereby the feed of the materials is arrested, and then setting the proper sheath-pipe $h$ to close the slits $g^3$ on its pipe $g$ and setting the valve 140 to open communication with the discharge-pipe, so that the water and steam propellers will scour out the distribution-pipes. When the scouring is completed, the sheath-pipe $h$ is shifted, so as to open the slits $g^3$, and the valve 140 turned to shut off the discharge-pipe. Then the proper carriers and elevator are started up, and the operation goes on as before.

Figures 11, 12:
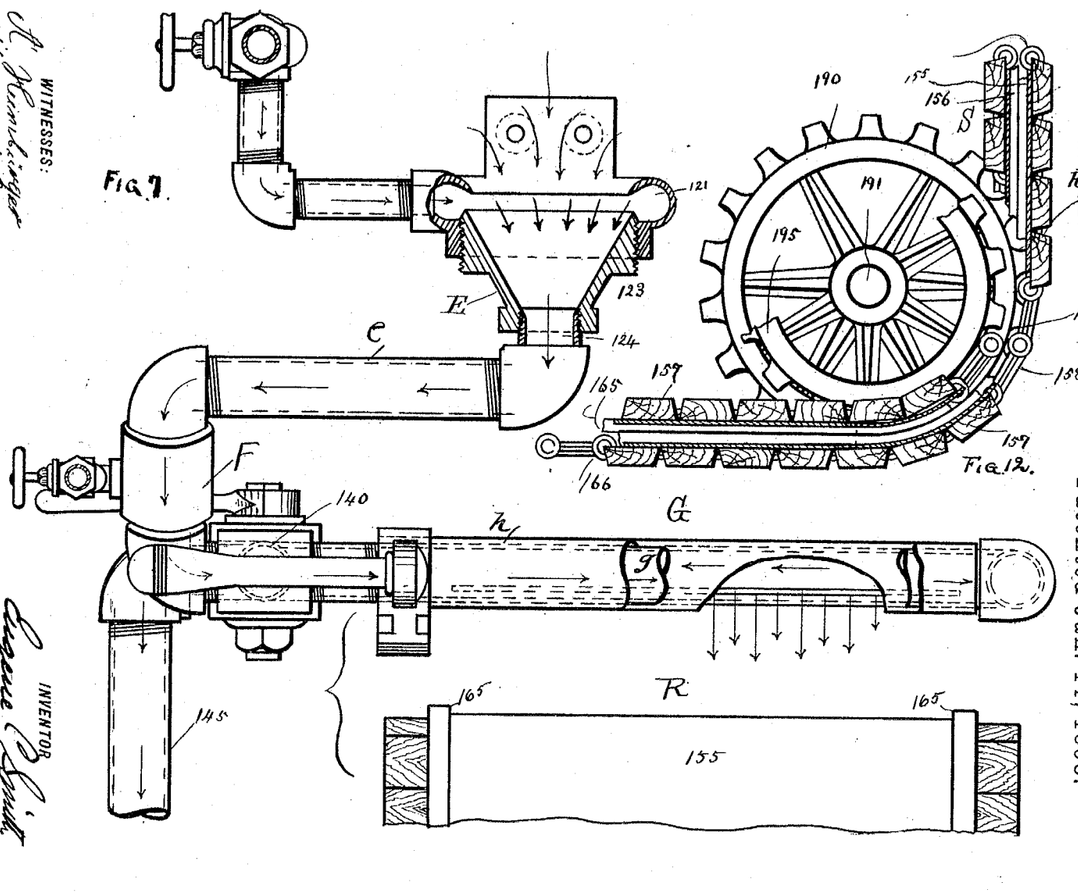
Fig. 11, Sheet 7, is a representation of rolls arranged as a substitute for the beaters.
Fig. 12, Sheet 6, is a broken detail, on a large scale, of the idlers or guide-sprockets at a point where the aprons which form the mold change their direction.
Figure 11:
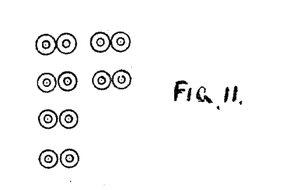
Figure 13:
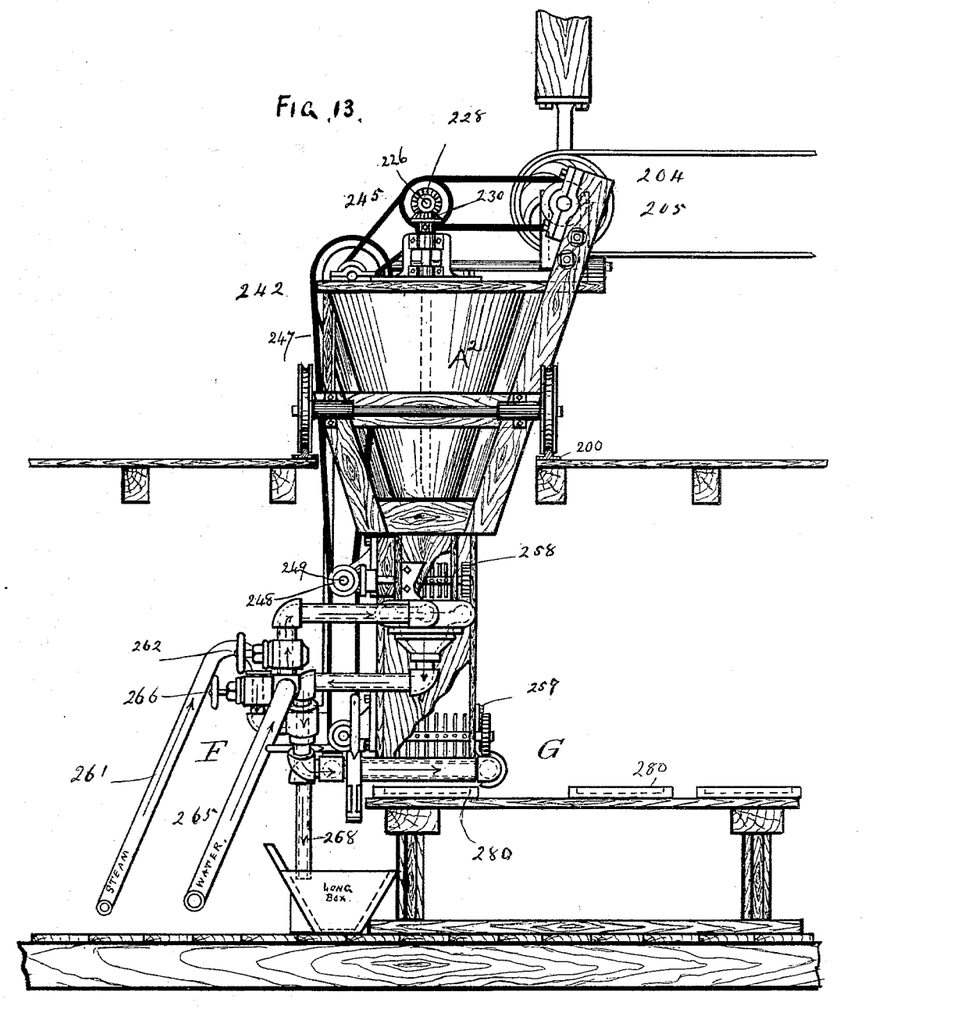
Fig. 13, Sheet 8, is an end elevation corresponding to Fig. 1 of an apparatus wherein the mixing devices travel, so that the "dry stuff" moves over the mass of "wet stuff.
Figure 14:
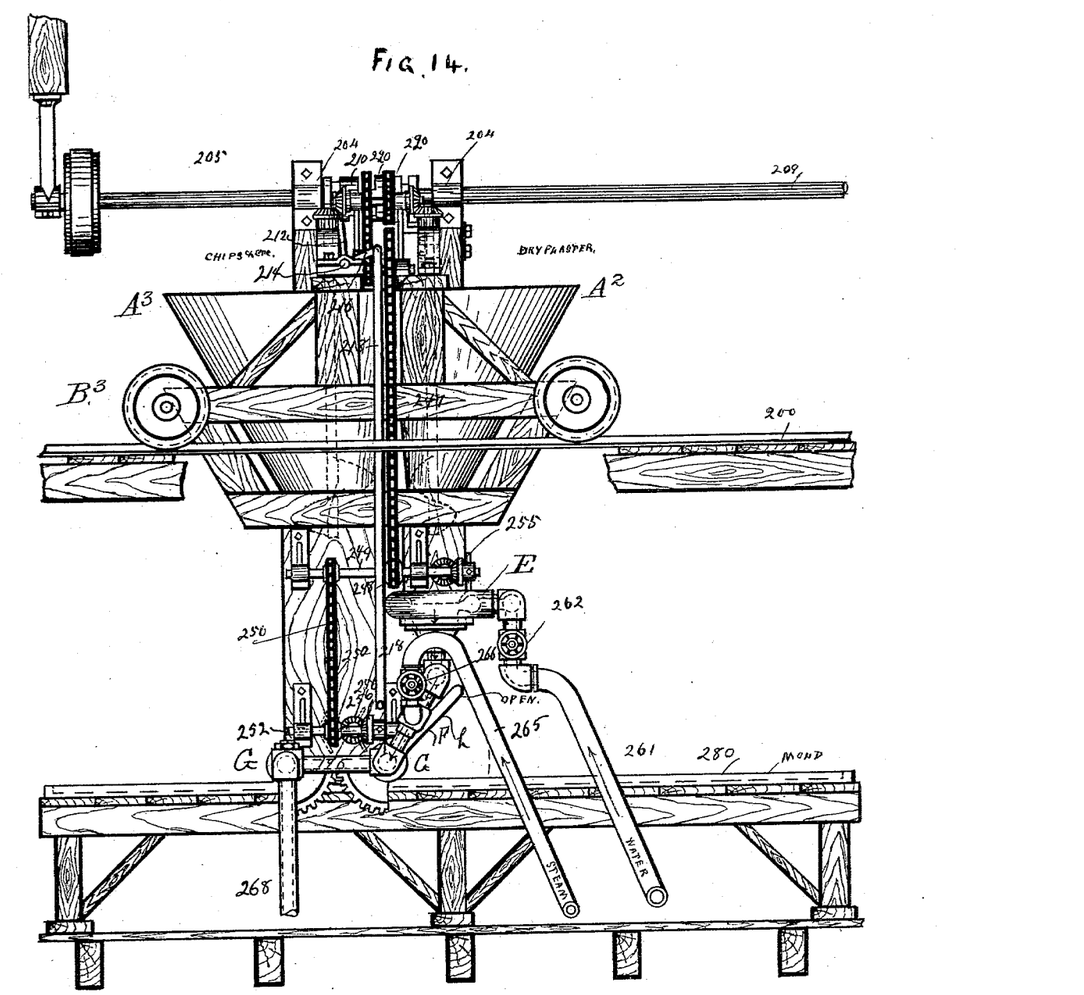
" Fig. 14, Sheet 9, is a side elevation of the traveling apparatus and corresponding with Fig. 2.
Figure 15:
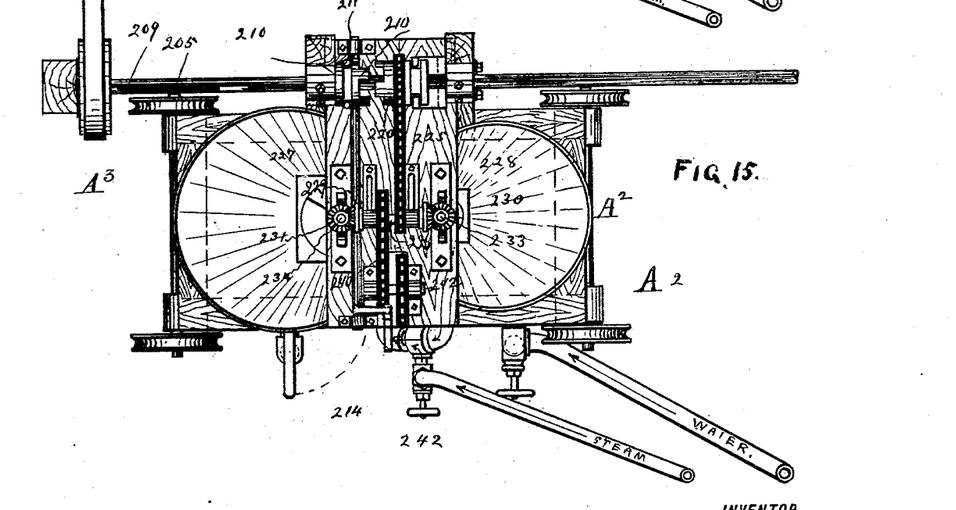
Fig. 15, Sheet 10, is a plan view.
Figure 16:
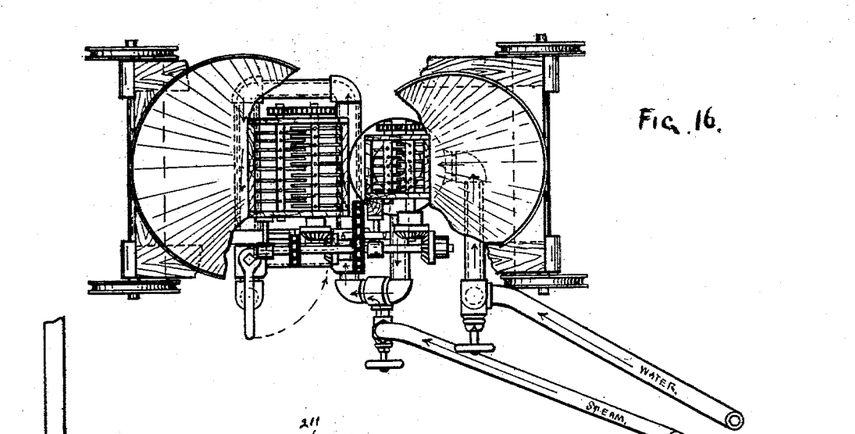
Fig. 16, same sheet, a broken plan now showing interior parts of the traveling machine.

*The aprons and traveling mold.*—The mold is formed of endless aprons R S, Figs. 2 and 12. Each apron consists of a rubber or similar belt or apron 155 156, respectively, as wide as the length of the hoppers A' A', and which width equals the length of the proposed slab. The belt 155 is secured to cross-slats 157, which are fastened to the links 158 of a sprocket-chain, 159 being rods or rollers at the hinge of the links. Along the parallel edges of the adjacent faces of one or both of the aprons 155 156 are fixed ribs or flanges 165, of rubber or similar material, so that when the aprons meet they form a rectangular mold the clear space of which determines the dimensions of the slab. Said apron R is guided around sprockets 175 176 178 and sprockets at the extreme right end on shaft $190^x$, Fig. 1, said shaft not being shown in Fig. 2, and said apron S is guided around sprockets 180 181 182 and sprockets at the extreme right on shaft $190^y$, Fig. 1. Apron R may be supported on rollers 185 under its returning length, Fig. 2. At one point the belts change from a vertical to a horizontal direction, and here the sprockets require a special construction. The apron R is made enough wider than apron S to place its links outside of the links of apron S, Fig. 3. Said apron R goes around the large sprockets 190, Figs. 2 and 12, fixed on shaft 191, to which shaft the power may be applied to drive the aprons. Adjacent to and inside of the sprockets 190 are the smaller sprocket-idlers 195, which are loose on the shaft 191. Said apron S may be driven by shaft $190^y$, Fig. 1, which will carry any sprocket or driving-gear suitable for the purpose of being connected with a prime mover, as a steam-engine. Apron R may of course be driven by its shaft $190^x$ and the prime mover. In this case the aforesaid large sprocket 190 can be loose on its shaft, if desired. The difference in the diameters of the sprockets 190 and 195 corresponds to the separation of the aprons R S.

At the straight parts of the mold the belts travel in the same direction and at the same speed, and the difference of linear speed of the meeting surfaces of the belts where they deflect is too small to be of practical importance, for at the point of deflection there will be a so-called "neutral line" of speed somewhere between the inner and outer surface of each belt. On this neutral line the speed of the belts will of course be the same around the deflection as it is in the straight part of the mold, and the variation of the inner surface of the outer belt and the outer surface of the inner belt from this speed is so small as not to be of practical consequence, and especially is this the case in my present machine on account of the comparatively very slow speed of the belts, which will not exceed about fifty linear feet per minute.

It is evident that the wet stuff and dry stuff, falling in the manner described on the apron R or S, will be conveyed into and through the mold formed by the aprons and there pressed, the surplus water being expelled, and finally delivered at the extreme right end of the mold on a platform and in a sufficiently hard condition to be cut into slabs and handled. The slabs may be piled to complete the drying.

Referring to Figs. 13 to 16, inclusive, the hoppers $A^2$ for the dry plaster and $A^3$ for the dry plaster and chips are mounted on a wheel-truck $B^3$, which may travel on rails 200, supported on timbers over the place to be filled with the composition, as the space between the beams of a building. A long main power-shaft 205, supported at a suitable place in the building, works easily through boxes 204, carried on standards secured to the hoppers $A^2$ $A^3$, Fig. 13. A clutch 210 slides on but revolves with shaft 205 by reason of the feather 209 and a groove in the hub of the clutch, and said clutch is positioned by the fork 211 on the end of the arm 212, which arm is fixed on the rock-shaft 214, which is rocked by the arm 216 through the medium of the depending rod 218, Figs. 14 and 15. A clutch 220, adapted to engage with clutch 210, is rigidly connected with a sprocket which drives chain 225, and that with a sprocket on shaft 226. Bevel-gears 228 229 on shaft 226 mesh, respectively, with bevel-gears 230 231 on vertical shafts 233 234, each shaft 233 234 carrying a screw-blade, (shown in dotted lines, Fig. 14,) which produces a regular downward feed of the materials. Shaft 226 also carries a sprocket, which drives chain 240, and that in turn a sprocket on shaft 242. A sprocket 245 on shaft 242 drives chain 247, and that a sprocket 248 on shaft 249. Another sprocket on shaft 249 drives chain 250, and that a sprocket on shaft 252, Fig. 14. Bevel-gears 255 256, respectively, on shafts 249 252 drive the beaters 258 259, respectively, situated in hoppers $A^2$ and $A^3$, Fig. 13.

At the bottom of hopper $A^2$ is the mixing-bowl and ejector-propeller E, similar to that before described, 261 being the water-pipe provided with valve 262. From bowl E the "stuff" goes to the steam ejector or propeller F, 265 being the steam-pipe with valve 266, and from thence to the distribution-pipes G, which are constructed as hereinbefore described and arranged below hopper $A^3$. A waste-pipe 268 leads down from one end of the distribution-pipes to over a long trough 270. The operation of the distribution-pipes G is the same as hereinbefore described. The pipes 261 and 265 are long flexible hose, which permit of the travel of the apparatus to and fro over the mold 280, if such mold is to be used, or over a space between the beams of a building. In operation the wet stuff escapes from the slits in the distribution-pipes G, as hereinbefore described, and into the mold 280. At the same time as the machine is being pushed to and fro over the mold the dry stuff falls down and upon and into every part of the wet stuff, the ejection of the wet stuff from the distribution-pipes and the motion of the apparatus providing for the relative motion of the dry stuff and the wet stuff, so that the dry stuff is incorporated with all parts of the wet stuff and takes up much of the surplus moisture.

To scour out the apparatus the clutch 210 is shifted from the clutch 220, stopping the beaters, and then the valves controlling the distribution-pipes G are set so as to close the slits in said distribution-pipes and allow the water and steam to circulate violently around in them and sweep the plaster particles out through pipe 268.

When one mold 280 is full, the machine is stopped, the mold taken away, another substituted, and the operation repeated.

Now, having described my improvements, I claim as my invention—

1. The process of manufacturing plaster-board hereinbefore described, consisting in mixing finely-divided plaster-of-paris with rapidly-moving streams or films of water, the water being in excess, removing the mixture rapidly from the place of mixture by the velocity of the water, projecting the mixture in films or streams through the air, and, while said films or streams are in motion in the air, projecting finely-divided dry plaster on and through the mixture, then forming a board of the mixture.

2. In a machine for manufacturing plaster-board, the combination of a mixing-chamber for plaster-of-paris and water and having an outlet and inlet, a connection therewith adapted to project water through and out of the chamber, a propeller connected with the outlet of said chamber, distribution-pipes operatively connected with said propeller and having outlets of comparatively small area adapted to discharge the mixture in films or streams, a receptacle for dry plaster situated over said distribution-pipes and adapted to discharge the dry material on and through said films or streams, and a mold for the mass adjacent to said distribution-pipes, substantially as described.

3. The combination in a machine for manufacturing plaster-board, of a mixing-chamber for plaster-of-paris and water, an outlet-pipe from said chamber, a propeller connected therewith and adapted to rapidly remove the mixture out of said chamber, distribution-pipes operatively connected with said propeller and consisting of inner and outer pipes provided with openings which are adapted to be closed and opened by the rotation of said outer pipe, a waste connection at the end of said distribution-pipes remote from the connection with the said propeller and a valve controlling said waste connection, substantially as described.

4. The combination in a machine for manufacturing plaster-board, of a mixing-chamber for plaster-of-paris and water having an inlet and outlet, a connection with said chamber adapted to project water rapidly through said chamber, a propeller operatively connected with the outlet from said chamber, distribution-pipes operatively connected with said propeller and consisting of inner and outer pipes provided with openings which are adapted to control the discharge of the mixture from said distribution-pipes, a traveling mold adapted to receive and press the mixture, and said molds being composed of belts which travel in the same direction at the same speed and form a receptacle open at the extreme ends and closed at the sides, substantially as described.

5. The combination in a machine for manufacturing plaster-board, of a mixing-chamber, a connection therewith adapted to project water through the chamber under pressure, a propeller operatively connected with the mixing-chamber and adapted to immediately remove the mixture therefrom, distribution-pipes operatively connected with said propeller and consisting of an inner perforated pipe and an outer rotatable sheath-pipe perforated to register with the perforations of the inner pipe in one position of the sheath-pipe, a receptacle for dry plaster adapted to project the dry plaster into the composition as the same discharges from the distribution-pipes, and a traveling mold adapted to receive the mixed composition and press the same into a slab, and said traveling mold being composed of aprons which travel in the same direction at the same speed and form a receptacle closed at the sides and open at the ends, substantially as described.

In testimony that I claim the foregoing as my invention I have signed my name, in presence of two witnesses, this 19th day of May, 1896.

EUGENE C. SMITH.

Witnesses:
GLENN FORD MCKINNEY,
HENRY V. BROWN.